United States Patent

[11] 3,605,088

| [72] | Inventor | Joseph A. Savelli<br>589 Magie Ave., Fairfield, Ohio 45014 |
|---|---|---|
| [21] | Appl. No. | 881,702 |
| [22] | Filed | Dec. 3, 1969 |
| [45] | Patented | Sept. 14, 1971 |

[54] VEHICLE TRAILER ANGULAR POSITION INDICATOR
16 Claims, 12 Drawing Figs.

| [52] | U.S. Cl. | 340/70, 340/52, 340/282, 116/31 |
|---|---|---|
| [51] | Int. Cl. | B60q 1/26 |
| [50] | Field of Search | 340/52, 70, 282; 116/31, 28 |

[56] References Cited
UNITED STATES PATENTS

| 2,050,948 | 8/1936 | Hekking | 116/28 |

*Primary Examiner*—Alvin H. Waring
*Attorney*—William R. Jacox

ABSTRACT: Apparatus for assisting the driver of a tow vehicle in moving a trailer vehicle in a reverse or backup direction. The apparatus of this invention particularly relates to a tow vehicle and a trailer vehicle which are pivotally attached one to the other. The apparatus of this invention includes means which sense and indicate the angular position of the trailer vehicle with respect to the tow vehicle and which also includes means which sense and indicate the angular position of the front wheels of the tow vehicle to assist the driver of the tow vehicle in reverse movement of the trailer vehicle.

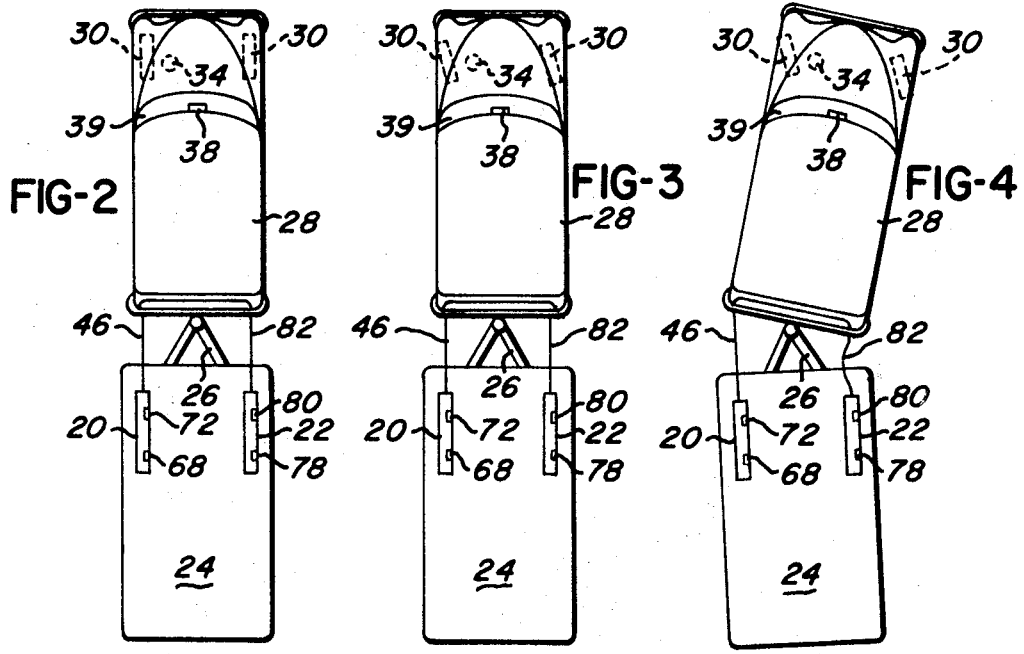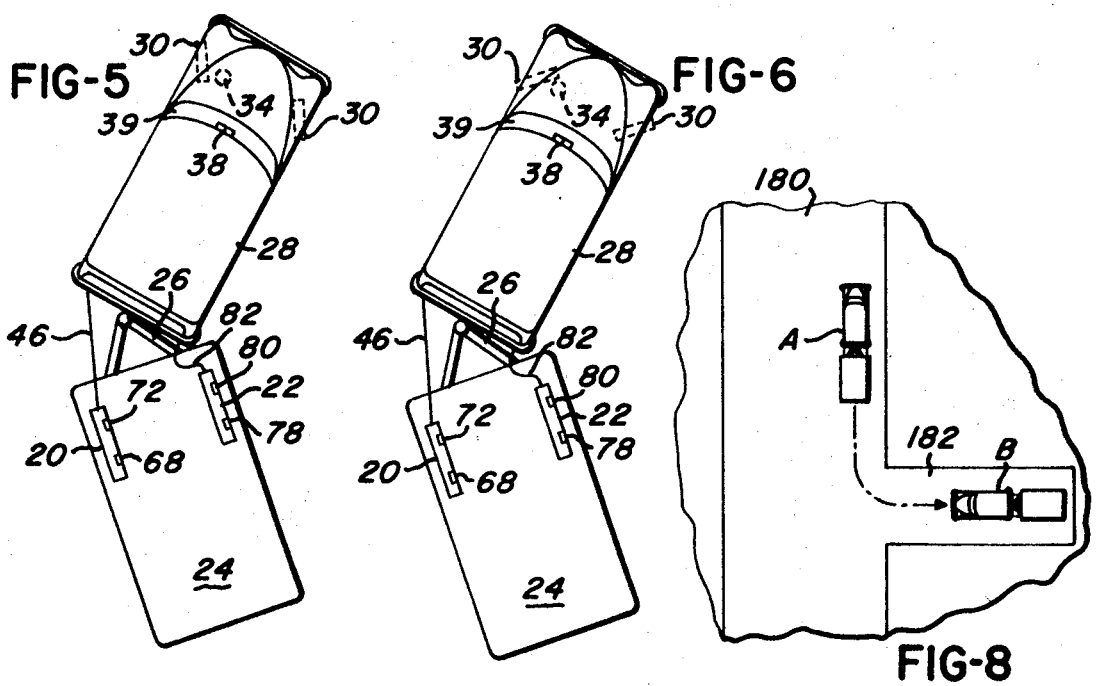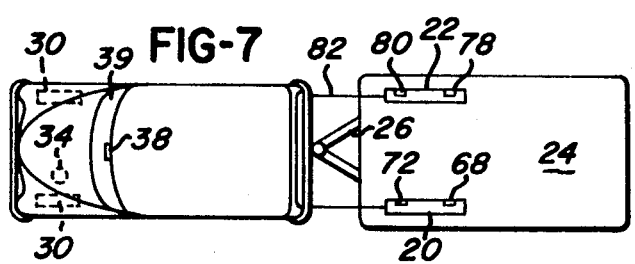

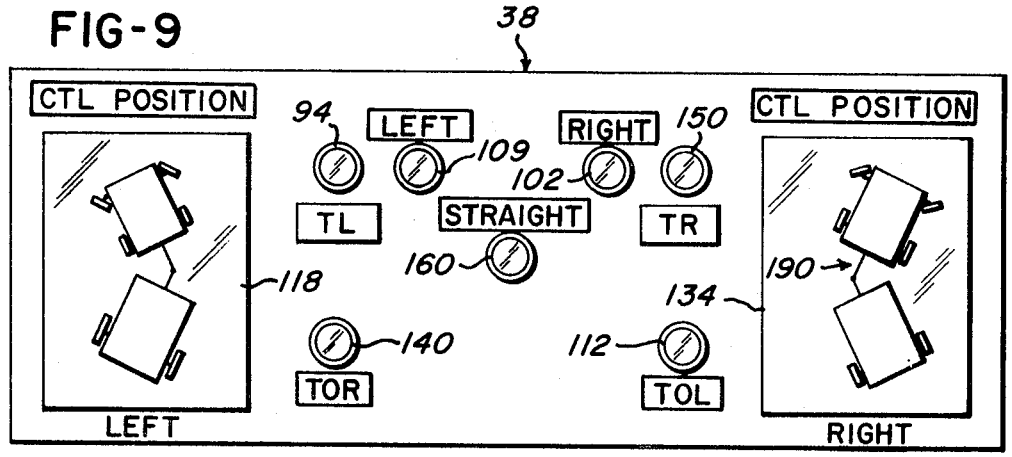
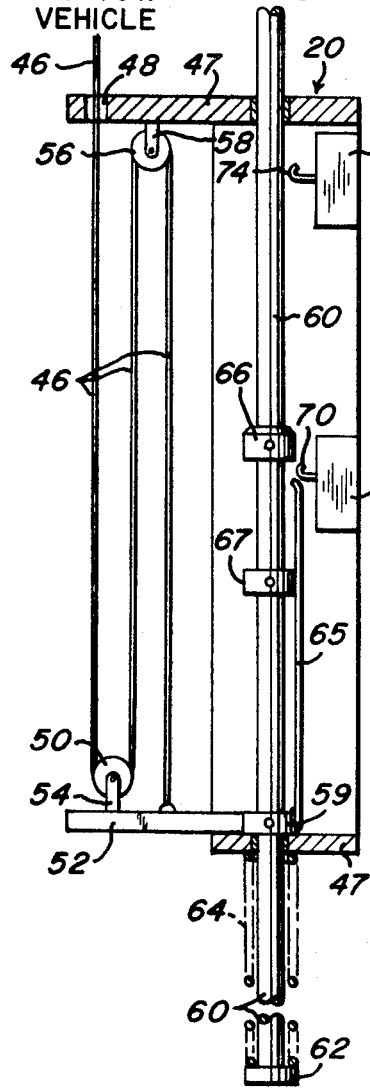
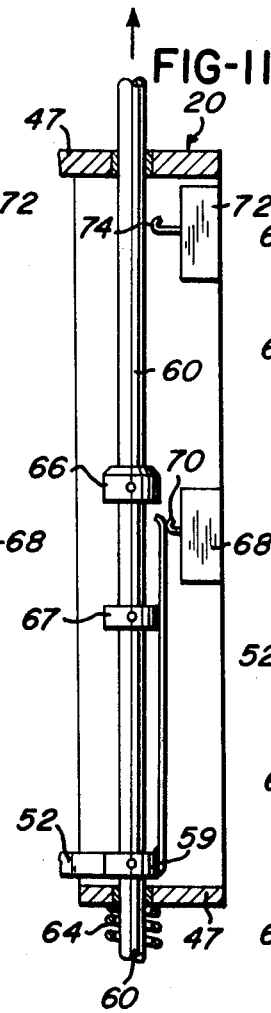
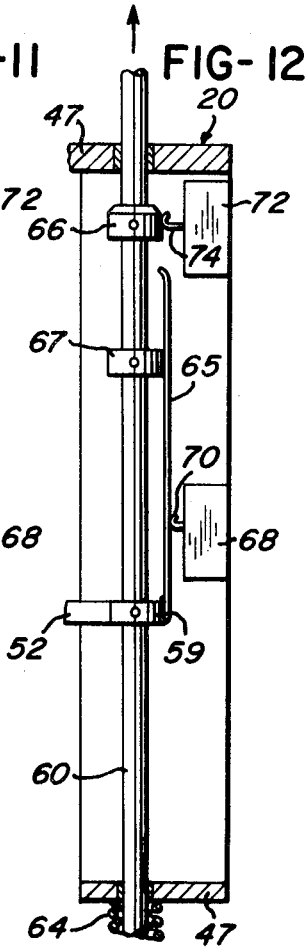
INVENTOR
JOSEPH A. SAVELLI
BY William R Jacox
ATTORNEY

VEHICLE TRAILER ANGULAR POSITION INDICATOR

BACKGROUND OF THE INVENTION

In many types of situations a trailer vehicle is towed behind a tow vehicle. Frequently, it is necessary to cause reverse movement of the trailer vehicle and tow vehicle to move the trailer vehicle to a desired location. However, many drivers of a tow vehicle encounter difficulty in properly backing or reversing the trailer vehicle to a desired location.

It is an object of this invention to provide means for assisting the driver of a tow vehicle in properly backing or reversing a trailer vehicle as the trailer vehicle is hitched to the automobile.

Other objects and advantages reside in the construction of the invention, combinations thereof, the method of manufacture, and the mode of operation, as will become more apparent from the following description.

BRIEF DESCRIPTION OF THE DRAWINGS

FIG. 2 is a diagrammatic top view of a tow vehicle and a trailer vehicle to which apparatus of this invention is connected. This figure shows the vehicles in a straight forward or a straight reverse condition.

FIG. 3 is a diagrammatic top view similar to FIG. 2, showing the front wheels of the tow vehicle turned in a direction for reversing the trailer vehicle in a desired manner.

FIG. 4 is a diagrammatic top view, similar to FIGS. 2 and 3, showing the vehicles after reversing movement of the vehicles has begun.

FIG. 5 is a diagrammatic top view similar to FIGS. 2, 3, and 4, showing the vehicles in a further position of reverse movement.

FIG. 6 is a diagrammatic top view, similar to FIGS. 2, 3, 4, and 5, showing the vehicles in a further position of reverse movement.

FIG. 7 is a diagrammatic top view similar to FIGS. 2, 3, 4, 5, and 6 showing the vehicles in a desired position following reverse movement thereof to a position which is angular with respect to the position of the vehicles shown in FIG. 2.

FIG. 8 is a diagrammatic top view, drawn on a much smaller scale than FIGS. 2, 3, 4, 5, 6, and 7, illustrating typical conditions within which reverse operation of the vehicles occurs and the general manner in which the reverse operation occurs as the vehicles are moved step by step in the manner illustrated in FIGS. 2-7.

FIG. 9 is a front elevational view, drawn on a much larger scale than FIGS. 2-8, showing a typical indicator panel which may be mounted in a tow vehicle as a part of the apparatus of this invention.

FIG. 10 is a top sectional view which may be considered as drawn on the same scale or a slightly smaller scale than FIG. 9, showing a portion of the control mechanism of the apparatus of this invention.

FIG. 11 is a top sectional view, similar to FIG. 10, showing the control mechanism thereof in another position of operation.

FIG. 12 is a top sectional view, similar to FIGS. 10 and 11, showing the control mechanism thereof in another position of operation.

DESCRIPTION OF THE PREFERRED EMBODIMENT

Figure 1:
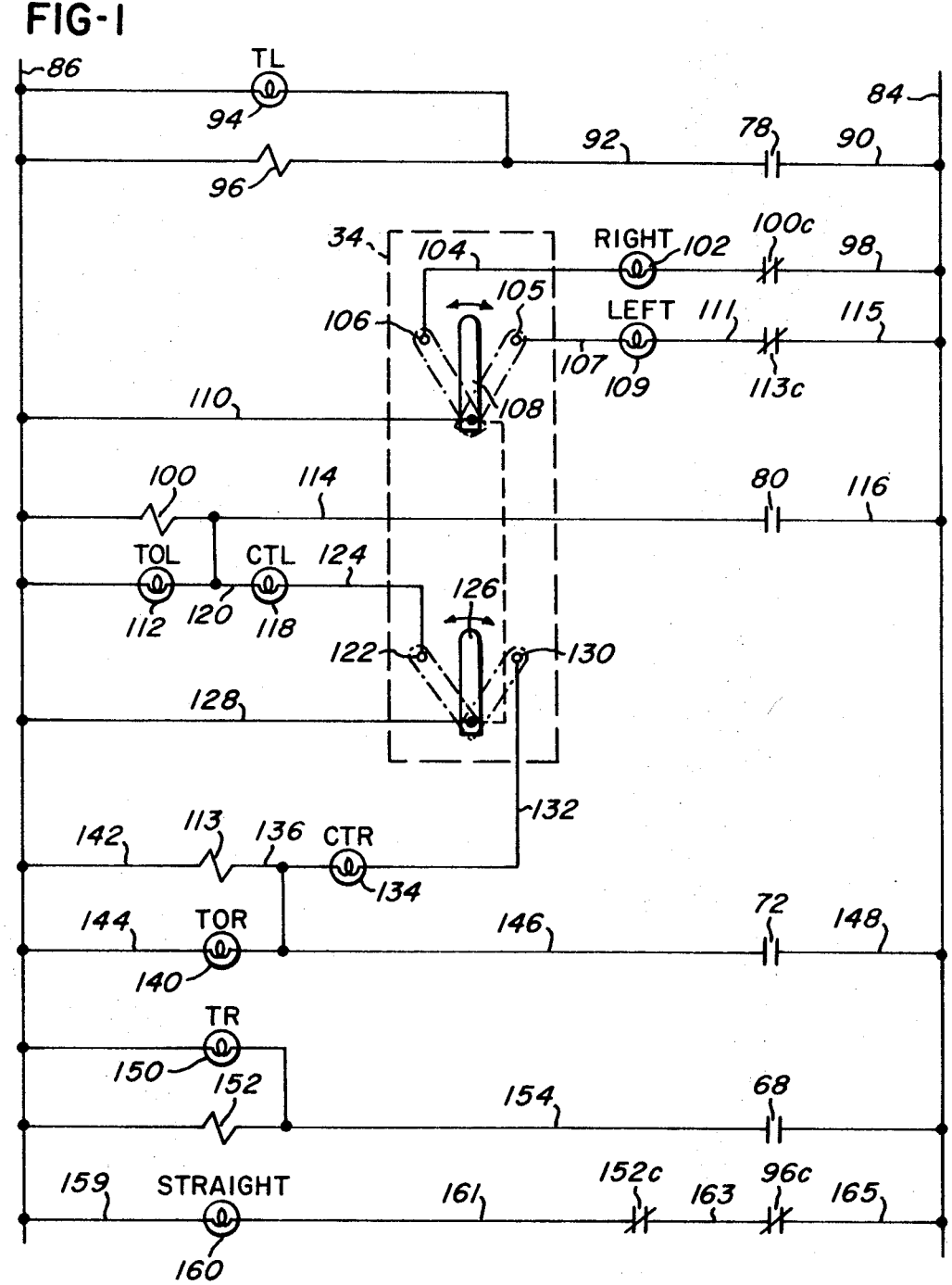
FIG. 1 is an electrical schematic diagram showing electrical elements of the apparatus of this invention.

The apparatus of this invention is adapted to be connected to a tow vehicle and to a trailer vehicle which is pivotally attached to the tow vehicle for movement thereby. During reverse operation of the vehicles, the apparatus of this invention assists the driver of the tow vehicle in properly operating the tow vehicle so that the trailer vehicle can be readily moved to a desired location.

The apparatus of this invention includes switch units 20 and 22, which are shown supported by a trailer vehicle 24, as illustrated in FIGS. 2-7. FIGS. 10, 11, and 12 show details of the switch unit 20. The switch unit 22 is substantially identical to the switch unit 20. Within the purview of this invention, the switch units 20 and 22 may be supported by the tow vehicle 28 rather than the trailer vehicle 24.

The trailer vehicle 24 has suitable wheel means, not shown, for support thereof. The trailer vehicle 24 has a yoke 26 which is pivotally attached to a tow vehicle 28.

The tow vehicle 28 is provided with front wheels 30 for steering thereof, and with rear wheels, not shown. As a part of the apparatus of this invention a rotary switch unit 34 is joined to the front wheels 30 in a manner not shown. The rotary switch unit 34 is operable with angular movement of the front wheels 30 as steering operation thereof occurs. Also, as a part of the apparatus of this invention, an indicator panel 38 is mounted in a convenient location adjacent a driver's position within the tow vehicle 28. For example, the panel 38 may be mounted on a dashboard 39 in a position which may be readily observed by the driver of the tow vehicle 28. Details of the panel 38 are shown in FIG. 9.

A flexible cable or line 46 is attached to the left rear portion of the tow vehicle 28 and extends into a housing 47 of the switch unit 20 through an orifice 48 as the housing 47 is attached to the left-hand portion of the trailer vehicle 24, as shown in FIGS. 2-7.

As shown in FIG. 10, the line 46 continues within the housing 47 of the switch unit 20 and has a portion thereof partially encompassing and in engagement with a pulley wheel 50 which is attached to a connector 52 by means of a bracket 54. The line 46 then extends within the unit 20 in a direction toward the tow vehicle 28 and partially encompasses and engages a pulley wheel 56 which is attached to the housing 47 by means of a bracket 58. The line or cable 46 then extends to the connector 52 and is secured thereto, as shown in FIG. 10.

A collar 59 attaches the connector 52 to an elongate rod 60 which is axially slidably retained by the housing 47. Exterior of the housing 47, the rod 60 has a shoulder 62. A coil spring 64 or the like engages the shoulder 62 and the housing 47. The coil spring 64 is shown encompassing the rod 60 and urges the rod 60 in a direction away from the tow vehicle 28. The collar 59 also has attached thereto an elongate cam 65, which extends in an axial direction along the rod 60. The cam 65 engages a collar 67 which is attached to the rod 60 and which is spaced from the collar 59.

Also attached to the rod 60 and spaced from the collar 67 is a collar 66. Supported by the housing 47 adjacent the rod 60 is an electric switch 68 which has an actuator stem 70 and an electric switch 72 which has an actuator stem 74. The switches 68 and 72 are in spaced-apart relationship. The contacts of the switches 68 and 72 are shown in the electric diagram of FIG. 3.

As stated above, the switch unit 22, shown in FIGS. 2-7 at the right-hand portion of the trailer vehicle 24, is substantially identical to the switch unit 20, which is shown in detail in FIGS. 10, 11, and 12. The switch unit 22 has switches 78 and 80, shown in FIGS. 2-7, which are similar to the switches 68 and 72 of the switch unit 20. The contacts of the switches 78 and 80 are shown in the electric circuit diagram of FIG. 1. The switch unit 22 has a cable or line 82 attached thereto in the manner described with respect to the line 46 and the switch unit 20. The line or cable 82 extends from the switch unit 22 and is attached to the right-hand portion of the tow vehicle 28, as shown in FIGS. 2-7.

FIG. 1 shows schematically the electrical portions of the apparatus of this invention.

Main conductors 84 and 86 are adapted to be joined to a source of electrical energy such as the terminals of a battery, not shown, or to any other suitable source of electrical energy.

The switch 78, the contacts of which are shown in FIG. 1, is connected by a conductor 90 to the main conductor 84. A conductor 92 joins the switch 78 to a lamp 94 and to a relay coil 96, as the coil 96 and the lamp 94 are joined in parallel relationship. The lamp 94 is also shown in FIG. 9 and is identified by the letters "TL", as shown in FIGS. 1 and 9. The lamp 94 and the relay coil 96 are also connected to the main conductor 86.

Also, connected to the main conductor 84 by a conductor 98 are normally closed contacts 100c which are operated by energization of a relay coil 100. The relay coil 100 is joined to the main conductor 86. Connected in series relationship with the contacts 100c is a lamp 102, which is joined by a conductor 104 to a terminal 106. The lamp 102 is also identified by the word "RIGHT" as shown in FIGS. 1 and 9. The terminal 106 is engageable by a pivotal contact arm 108, which is joined to the main conductor 86 by a conductor 110. The pivotal arm 108 is also engageable with a terminal 105 which is connected by a conductor 107 to a lamp 109. The pivotal arm 108 and the terminals 105 and 106 are part of the rotary switch unit 34 shown in FIGS. 2-7. The lamp 109 is also identified by the word "LEFT," as shown in FIGS. 1 and 9. The lamp 109 is connected by a conductor 111 to normally closed contacts 113c, which are also joined to the main conductor 84 by a conductor 115.

The relay coil 100 is in a parallel relationship with a lamp 112, which is also identified by the letters "TOL," as shown in FIGS. 1 and 9. The coil 100 and the lamp 112 are joined by a conductor 114 to the switch 80 of the switch unit 22. The switch 80 is connected to the main conductor 84 by a conductor 116.

The lamp 112 and the relay coil 100 are connected to a lamp 118 by a conductor 120. The lamp 118 is also joined to a terminal 122 by means of a conductor 124. The terminal 122 is engageable by a pivotal contact arm 126 which is connected to the main conductor 86 by a conductor 128. The contact arm 126 is also engageable with a terminal 130 which is joined by a conductor 132 to a lamp 134 which is also identified by the letters "CTR," as shown in FIGS. 1 and 9. The pivotal arm 126 and the terminals 122 and 130 are also part of the rotary switch unit 34 shown in FIGS. 2-7. The pivotal arms 108 and 126 are mechanically joined together for movement one with the other, as illustrated in FIG. 1.

The lamp 134 is joined by a conductor 136 to a relay coil 113 and to a lamp 140, which are in parallel relationship. The lamp 140 is also identified by the letters "TOR," as shown in FIGS. 1 and 9. The relay coil 113 when energized opens the normally closed contacts 113c, discussed above. The relay coil 113 and the lamp 140 are also joined to the main conductor 86 by conductors 142 and 144, respectively. The lamp 140 and the relay coil 113 are connected by means of a conductor 146 to the switch 72 of the switch unit 20 and the switch 72 is connected to the main conductor 84 by means of a conductor 148.

A lamp 150 and a relay coil 152 are connected in parallel relationship and are joined to the main conductor 86 and are also connected by means of a conductor 154 to the switch 68 of the switch unit 20. The lamp 150 is also identified by the letters "TR," as shown in FIGS. 1 and 9.

A lamp 160, which is also identified by the word "STRAIGHT," as shown in FIGS. 1 and 9, is connected to the main conductor 86 by a conductor 159 and to normally closed contacts 152c by a conductor 161. The contacts 152c are operated by energization of the relay coil 152. A conductor 163 joins the contacts 152c to normally closed contacts 96c, which are operated by energization of the relay coil 96. The contacts 96c are joined by a conductor 165 to the main conductor 84.

OPERATION

FIG. 2 shows the tow vehicle 28 and the trailer vehicle 24 in straight positions, to move straight forward or straight reverse. However, for the purposes of this description, it is assumed that the vehicles 24 and 28 are in position "A" located in a street 180, shown in FIG. 8. It is desired, by reverse movement, to move the trailer vehicle 24 by means of the tow vehicle 28 into a driveway 182 to a position "B" within the driveway 182, as shown in FIG. 8.

In order to perform such reverse movement with the assistance of the apparatus of this invention, the panel 38 is observed by the driver of the tow vehicle 28. When the tow vehicle 28 and the trailer vehicle 24 are positioned as shown in FIG. 2 and as shown in the "A" position of FIG. 8, an electric circuit exists through the normally closed contacts 96c, and 152c and through the lamp 160, shown in FIG. 1. The lamp 160, as stated above, is also identified by the word "STRAIGHT." The lamp 160 is also shown in FIG. 9 and is thus lighted when the tow vehicle 28 and the trailer vehicle 24 are positioned in the straight position shown in FIG. 2 and as shown at "A" in FIG. 8. The lamp 160 when lighted thus indicates that the vehicles are in longitudinally straight alignment, as shown in FIG. 2.

In order to reverse the trailer vehicle 24 into the driveway 182, it is necessary to obtain an angular relationship between the tow vehicle 28 and the trailer vehicle 24 during reverse movement thereof. In order to obtain such an angular relationship, it is first necessary to move the front wheels 30 of the tow vehicle 28 angularly with respect to the axis of the tow vehicle 28. In order to reverse the trailer vehicle 24 to the right, the front wheels 30 are first moved angularly to the position shown in FIG. 3. When this occurs the contact arm 108, which is a part of the rotary switch unit 34 connected to the steering mechanism of the tow vehicle 28, is pivotally moved to the left and engages the terminal 106, as illustrated by broken lines in FIG. 1. Thus, the lamp 102 is energized. This lamp 102, which is also identified by the label "RIGHT," when illuminated, indicates that the front wheels 30 of the tow vehicle 28 have been angularly moved to a position in which backing the trailer vehicle 24 to the right is possible.

Then the driver of the tow vehicle 28 begins to reverse the tow vehicle 28, and of course, the trailer vehicle 24 is also moved in a reverse direction. After a predetermined distance of movement of the vehicles 28 and 24, the vehicles 28 and 24 are positioned as illustrated in FIG. 4. As the vehicles 28 and 24 move from the positions thereof shown in FIG. 3 to the positions thereof shown in FIG. 4, the vehicles 28 and 24, in addition to reverse movement, move angularly one with respect to the other, as shown in FIG. 4. When such angular movement occurs, the left rear portion of the tow vehicle 28 and the front left portion of the trailer vehicle 24 are moved a greater distance apart. Thus, the line or cable 46, which is attached to the left rear portion of the tow vehicle 28 and to the switch unit 20, causes a pulling action upon the connector 52 within the switch unit 20. Thus, the connector 52, which is attached to the rod 60, pulls the rod 60 forwardly, toward the tow vehicle 28, from the position thereof shown in FIG. 10 to the position thereof shown in FIG. 11.

Because the line 46 engages the pulley wheels 50 and 56, the amount of travel between the left portions of the vehicles 28 and 24 can be considerable while the amount of travel of the extension 52 is rather small. Therefore, the physical size of the switch unit 20 and the elements therewithin and the spacing of the elements within the switch unit 20 may be relatively small.

When the rod 60 is moved to the position thereof shown in FIG. 11, the elongate cam 65 is in engagement with the stem 70 of the switch 68. Thus, the switch 68 is operated, and the normally open contacts thereof shown in FIG. 1 are closed. Therefore, the lamp 150 is energized. The lamp 150 is also identified by the label "TR," which when illuminated, indicates that the trailer vehicle 24 is turning right, which, of course is the direction desired to reverse the trailer vehicle 24 into the driveway 182.

Also, when the normally open switch 68 is closed, the relay coil 152 is energized and the normally closed contacts 152c, operated thereby, are opened. Thus, the lamp 160, identified by the word "STRAIGHT" is deenergized.

Reverse operation of the tow vehicle 28 and the trailer vehicle 24 continues until the positions thereof become as illustrated in FIG. 5. When this occurs, the vehicles 28 and 24, in addition to greater reverse movement, have become more angular, one with respect to the other. Thus, the left portions of the vehicles 28 and 24 have become more separated. Therefore, the line 46 has pulled the connector 52 and the rod 60 of the switch unit 20 farther toward the tow vehicle 28. Thus, the rod 60 has been moved to the position thereof illustrated in FIG. 12. The cam 65 is still in engagement with the actuator stem 70 of the switch 68, and thus the contacts thereof shown in FIG. 1 remain closed. However, when the rod 60 is positioned as shown in FIG. 12, the collar 66 which is attached to the rod 60 is in engagement with the stem 74 of the switch 72. Thus, the switch 72 is operated, and the normally open contacts 72 shown in FIG. 1 are closed. Therefore, an electrical circuit is established to the lamp 140, which is also identified by the letters "TOR," and which is energized and illuminated. This indicates that the vehicles 28 and 24 have reached the minimum angular positions thereof, and the front wheels 30 of the tow vehicle 28 must be turned in the opposite direction.

Also, when the normally open switch 72 is closed, the relay coil 113 is energized and the normally closed contacts 113c are opened.

When the lamp 140 (TOR) is illuminated, the driver of the tow vehicle 28 knows that this is an indication to turn the wheels opposite and to the right. The driver thus angularly moves the front wheels 30 of the tow vehicle 28 to the right. When this angular movement of the front wheels 30 occurs, the front wheels 30 are moved to the position thereof shown in FIG. 6. Thus, the pivotal contact arm 126, of the rotary switch mechanism 34, which is connected to the steering mechanism for the front wheels 30, is moved clockwise as illustrated by broken lines in FIG. 1.

Thus, the contact arm 126 engages the terminal 130 and the lamp 134 is illuminated. The lamp 134, when lighted, illuminates a diagram 190, shown in FIG. 9. The diagram 190 reveals the relative positions of the trailer vehicle 24 and the tow vehicle 28 and the angular position of the front wheels 30 of the tow vehicle 28 at the time the diagram 190 is illuminated.

Then the driver of the tow vehicle 28 continues reverse operation of the tow vehicle 28 and the trailer vehicle 24. Therefore, reverse movement of the trailer vehicle 24 to the right continues and the trailer vehicle 24 moves into the driveway 182 to the position "B" shown in FIG. 8.

It is thus understood that the driver of the tow vehicle 28 has operated the tow vehicle 28 under assistance of operation of the panel 38 and has reversed the trailer vehicle 24 in a desired manner and to a desired position with a minimum amount of effort.

Also, it is to be understood that the apparatus of this invention also provides assistance to the driver of the tow vehicle 28 for reverse operation of the trailer vehicle 24 to the left. Such operation would, of course, occur in a manner similar to that discussed above with respect to reverse operation of the trailer vehicle 28 to the right, but by use of some of the other elements of the apparatus.

It is also to be understood that within the purview of this invention control mechanism may be provided which will also assist a driver of the tow vehicle 28 to reverse the trailer vehicle 24 to an angular position which is other than ninety degrees from the starting position.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

The invention having thus been described, the following is claimed:

1. Apparatus for assisting the driver of a tow vehicle in reverse operation of the tow vehicle and a trailer vehicle which is pivotally attached to the tow vehicle, the tow vehicle having steering mechanism, comprising:
   first switch means, the first switch means being joined to the steering mechanism of the tow vehicle for operation therewith,
   second switch means,
   means operably joining the second switch means to the tow vehicle and to the trailer vehicle,
   indicator means,
   means joining the first switch means to the second switch means and to the indicator means,
   the indicator means providing an indication of the angular relationship between the tow vehicle and the steering mechanism thereof and the angular relationship between the tow vehicle and the trailer vehicle,
   the indicator means thus providing an indication to the driver of the tow vehicle for operation of the tow vehicle for reversing of the trailer vehicle.

2. The apparatus of claim 1 in which the first switch means includes rotary switch elements.

3. The apparatus of claim 1 in which the second switch means is supported by the trailer vehicle.

4. The apparatus of claim 1 in which the second switch means are carried by the trailer vehicle and cable means join the tow vehicle to the second switch means for operation of the second switch means as relative angular movement occurs between the tow vehicle and the trailer vehicle.

5. The apparatus of claim 1 in which the second switch means comprises a pair of switch members supported by the trailer vehicle, there being a right switch member adjacent the right-hand portion of the trailer vehicle, there being a left switch member adjacent the left-hand portion of the trailer vehicle,
   a right cable attached to the right-hand portion of the tow vehicle and to the right switch member for operation of the right switch member with relative movement between the right cable and the right switch member,
   a left cable attached to the left-hand portion of the tow vehicle and to the left switch member for operation of the left switch member with relative movement between the left switch member and the left cable,
   the left cable thus moving with respect to the left switch member to operate the left switch member when the angular relationship between the right-hand portion of the tow vehicle and the right-hand portion of the trailer vehicle is a predetermined angle less than 180°, the right cable thus moving with respect to the right switch member to operate the right switch member when the angular relationship between the left-hand portion of the tow vehicle and the left-hand portion of the trailer vehicle is a predetermined angle less than 180°.

6. The apparatus of claim 5 in which the left switch member comprises a plurality of switch elements, there being a first switch element and a second switch element, operator means attached to the left cable and movably engageable with the switch elements for operation thereof, the left cable moving the operator means to engage the first switch element for operation thereof when the left cable is moved a given distance with respect to the left switch, the left cable moving the operator means a greater distance to engage the second switch element for operation thereof when the left cable is moved a predetermined greater distance with respect to the left switch.

7. The apparatus of claim 1 in which the second switch means includes a housing, a plurality of spaced-apart switch elements within the housing, an elongate rod carried by the housing and axially movable with respect thereto, the elongate rod being adjacent the switch elements, a cam member attached to the rod and movable thereby into engagement with one of the switch elements for operation thereof, a collar attached to the rod and movable thereby into engagement with another of the switch elements for operation thereof.

8. The apparatus of claim 7 in which the housing is attached to the trailer vehicle, cable means, means attaching the cable means to the rod and to the tow vehicle for axial movement of the rod with pivotal movement between the tow vehicle and the trailer vehicle.

9. The apparatus of claim 8 which includes pulley means, means attaching the pulley means to the switch means, the cable means being in engagement with the pulley means so that relative movement between the tow vehicle and the trailer vehicle through a given distance causes movement of the rod through a lesser distance.

10. The apparatus of claim 9 which includes means attaching the pulley means to the housing and to the rod.

11. For use with a tow vehicle and a trailer vehicle pivotally attached thereto for assisting in reverse operation thereof, the tow vehicle having front wheel-steering mechanism,
   first electric switch means, the first electric switch means being operably joined to the front wheel-steering mechanism for operation therewith,
   indicator means carried by the tow vehicle, the indicator means indicating the angular relationship between a tow vehicle and the steering mechanism thereof and the angular relationship between the tow vehicle and a trailer vehicle,
   second electric switch means, the second electric switch means being carried by one of the vehicles,
   means operably joining the second electric switch means to the other vehicle for operation of the second electric switch means with relative angular movement between the vehicles,
   electric conductor means joining the first electric switch means and the second electric switch means one to the other and to the indicator means,
   the indicator means thus providing an indication to the driver of the tow vehicle for operation of the tow vehicle for reversing of the trailer vehicle.

12. The apparatus of claim 11 in which the indicator means includes a panel provided with lamp members.

13. The apparatus of claim 12 in which the panel includes a diagram portion which when lighted illustrates the relative angular positions of the vehicles.

14. In combination with a tow vehicle and a trailer vehicle which is pivotally attached to the tow vehicle, the tow vehicle being provided with steering mechanism,
   an electric switch member carried by the trailer vehicle,
   an elongate flexible connector member attached to the electric switch member and to the tow vehicle, tension forces occurring in the elongate flexible connector member when pivotal movement occurs between the tow vehicle and the trailer vehicle, such tension forces in the elongate flexible connector member causing operation of the electric switch member,
   a rotary electric switch member joined to the steering mechanism of the tow vehicle for operation thereby,
   an electrically operable indicator member carried by the tow vehicle,
   electric conductor means connecting together the electric switch member and the rotary electric switch member and the electrically operable indicator member,
   the electrically operable indicator member thus indicating the angular relationship between the tow vehicle and the trailer vehicle and the angular relationship between the tow vehicle and the steering mechanism thereof.

15. The apparatus of claim 14 in which the electrically operable indicator member includes electric lamp members and in which the electric switch member is electrically connected to at least one of the lamp members for control of energization thereof and in which the rotary electric switch member is electrically connected to at least one of the lamp members for control of energization thereof.

16. For a tow vehicle and a trailer vehicle which is pivotally attached thereto, the tow vehicle being provided with steering mechanism,
   a plurality of electric switch members,
   means operably joining the switch members to the tow vehicle and to the trailer vehicle for operation of the switch members with pivotal movement between the tow vehicle and the trailer vehicle,
   rotary electric switch means for operable connection to the steering mechanism of the tow vehicle,
   electrically operable indicator means,
   a source of electrical energy,
   means connecting the electrically operable indicator means and the rotary electric switch means and the electric switch members to the source of electrical energy,
   the electrically operable indicator means including electric lamp members, one of the electric switch members being electrically connected to at least one of the lamp members for control of energization thereof, the rotary electric switch means being electrically connected to at least one of the lamp members for control of energization thereof,
   a pair of main conductors, there being a first main conductor and a second main conductor,
   a first switch member joined in series relationship with a parallel combination of a relay coil of a first relay and a turning left lamp, the series being connected between the first conductor and the second conductor,
   a first rotary switch having an arm connected to the first conductor, the first rotary switch having a first terminal connected to the second conductor through a "right" lamp in series with normally closed contacts of a second relay, the first rotary switch having a second terminal connected to the second conductor through a "left" lamp in series with normally closed contacts of a third relay,
   a second switch member connected in series with a relay coil of the second relay, the series being connected between the first conductor and the second conductor,
   a "turn opposite left" lamp connected to the first conductor and to the junction between the relay coil of the second relay and the second switch member,
   a second rotary switch, the second rotary switch having a first terminal and a second terminal and an arm, the arm being connected to the first conductor,
   a "car-trailer left position" lamp joined to the "turn opposite left" lamp and to the first terminal of the second rotary switch,
   a "car-trailer right position" lamp joined to the second terminal of the second switch member and to a relay coil of the third relay, the relay coil of the third relay being connected to the first conductor,
   a "turn opposite right" lamp connected to the first conductor and to the juncture between the relay coil of the third relay and the "car-trailer right position" lamp,
   a third switch member joined to the "turn opposite right" lamp and to the second conductor,
   a "turning right" lamp and a relay coil of a fourth relay connected in parallel and to the first conductor,
   a fourth switch member connected to the "turning right" lamp and to the relay coil of the fourth relay and to the second conductor,
   a "straight" lamp connected to the first conductor and to the second conductor through a series of normally closed contacts of the fourth relay and normally closed contacts of the first relay.